United States Patent
Chen et al.

(10) Patent No.: US 7,509,184 B2
(45) Date of Patent: Mar. 24, 2009

(54) TAPE-OUT FORM GENERATION METHODS AND SYSTEMS

(75) Inventors: Szu-Ping Chen, Hsinchu (TW); Piao-Chuo Tsao, Bade (TW); Yu Chen, Hsinchu (TW); Shin-Meei Wang, Taichung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 315 days.

(21) Appl. No.: 11/397,943

(22) Filed: Apr. 4, 2006

(65) Prior Publication Data

US 2006/0247977 A1 Nov. 2, 2006

Related U.S. Application Data

(60) Provisional application No. 60/668,175, filed on Apr. 4, 2005.

(51) Int. Cl.
*G06Q 3/00* (2006.01)
*G06Q 30/00* (2006.01)
*G06F 19/00* (2006.01)

(52) U.S. Cl. .......................... 700/97; 715/222

(58) Field of Classification Search ............ 700/95–97, 700/117, 120, 121; 715/221–226, 961, 964, 715/965, 968, 970; 716/1, 19–21; 438/942–952, 438/975
See application file for complete search history.

(56) References Cited

U.S. PATENT DOCUMENTS

| | | | | |
|---|---|---|---|---|
| 6,643,841 B2 * | 11/2003 | Chang et al. | ............... | 716/19 |
| 6,647,305 B1 * | 11/2003 | Bigelow | .................. | 700/97 |
| 6,725,237 B2 * | 4/2004 | Clairmont et al. | ........ | 707/104.1 |
| 6,742,165 B2 * | 5/2004 | Lev et al. | .................... | 716/1 |
| 6,954,907 B2 * | 10/2005 | Nakano et al. | ................ | 716/1 |
| 6,964,030 B2 * | 11/2005 | Hong et al. | .................. | 716/12 |
| 7,003,362 B2 * | 2/2006 | Tsao et al. | ................... | 700/97 |
| 7,062,342 B1 * | 6/2006 | Feng et al. | ................... | 700/97 |
| 7,197,723 B2 * | 3/2007 | Braun et al. | ................. | 716/3 |
| 7,296,254 B2 * | 11/2007 | Tsao et al. | ................... | 716/19 |
| 2002/0078422 A1 * | 6/2002 | Bradley et al. | ................ | 716/1 |
| 2003/0060284 A1 * | 3/2003 | Hamalainen et al. | ......... | 463/42 |
| 2004/0083426 A1 * | 4/2004 | Sahu | ......................... | 715/505 |
| 2005/0114327 A1 * | 5/2005 | Kumamoto et al. | ........... | 707/3 |
| 2005/0132306 A1 * | 6/2005 | Smith et al. | ................... | 716/1 |
| 2005/0198212 A1 * | 9/2005 | Zilberfayn et al. | .......... | 709/219 |
| 2006/0026549 A1 * | 2/2006 | Tsao et al. | ................... | 716/19 |
| 2006/0123331 A1 * | 6/2006 | Hightower et al. | .......... | 715/505 |
| 2007/0099093 A1 * | 5/2007 | Zhang et al. | ................... | 430/5 |

* cited by examiner

*Primary Examiner*—M. N. Von Buhr
(74) *Attorney, Agent, or Firm*—Thomas, Kayden, Horstemeyer & Risley

(57) ABSTRACT

Computer-implemented tape-out form generation methods and systems. A database, comprising tape-out types, and corresponding questions and answers, is provided. The questions and the answers are generated according to historical or/and new-technological manufacturing data. The tape-out types are displayed and selected. Corresponding questions and answers of the selected tape-out type are displayed. The answers are selected and tape-out forms are generated accordingly.

31 Claims, 6 Drawing Sheets

TAPE-OUT FORM GENERATION METHODS AND SYSTEMS

CROSS REFERENCE TO RELATED APPILCATIONS

This application claims the benefit of U.S. Provisional Application No. 60/668,175, filed Apr. 4, 2005.

BACKGROUND

The present invention relates to integrated circuit manufacturing methods, and in particular to computer-implemented tape-out form generation methods and systems.

In integrated circuit (IC) related manufacturing foundries, such as semiconductor product foundries, tape-out indicates the final stage of integrated circuit design and the first stage for manufacturing based on orders from customers. After tape-out forms are generated, descriptions of a circuit will be sent for manufacture. Tape-out forms are basically data files describing manufacturing related data and other details, such as mask tooling information for manufacturers or technology information.

Conventionally, tape-out forms are manually generated. FIG. 1 is a diagram of a conventional method of tape-out form generation. Integrated circuit designers 100 transmit layouts of integrated circuits. Tape-out engineers and/or customers 102 input related data according to the transmitted layouts. The selections and related data may refer to user manuals 104 in large-numbered pages. Thus, tape-out data input is error-prone and time-consuming for tape-out engineers and customers. After all tape-out data is ready, tape-out forms 106 are accomplished accordingly. The tape-out forms 106 may be sent to mask manufacturers or mask manufacturing departments 108 for actual integrated circuit manufacture.

Some partially improved methods and systems have been provided. While manual execution cannot be eliminated, the improved methods and systems cannot be utilized in all IC-related manufacturers. Thus, a computer-implemented tape-out form generation method is desirable.

SUMMARY

An embodiment of the invention provides computer-implemented tape-out form generation methods. A database, comprising tape-out types, and corresponding questions and answers, is provided. The questions and answers are generated according to historical and/or new-technological manufacturing data. The tape-out types are displayed and a tape-out type is then selected therefrom. The questions and corresponding answers of the selected tape-out type are displayed. Selections of the answers are received and tape-out forms are generated accordingly.

BRIEF DESCRIPTION OF THE DRAWINGS

The invention can be more fully understood by reading the subsequent detailed description and examples with references made to the accompanying drawings, wherein.

DESCRIPTION

Figure 2:
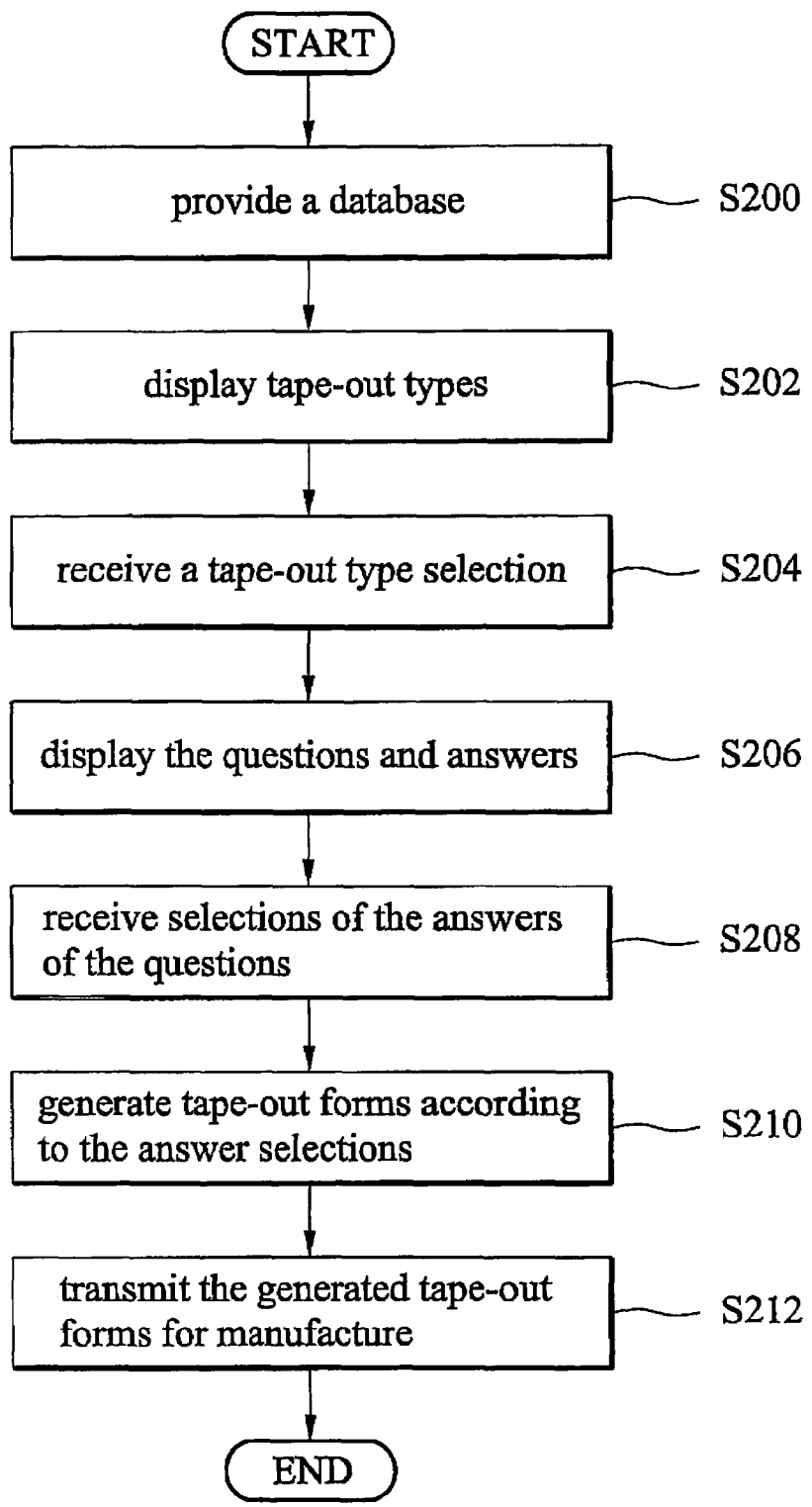
FIG. 2 is a flowchart of an embodiment of a computer-implemented tape-out form generation method.

FIG. 2 is a flowchart of an embodiment of a computer-implemented tape-out form generation method. A database, comprising tape-out types, questions corresponding to the tape-out types, and answers corresponding to the questions, is provided (step S200). The questions and the answers are generated according to historical and/or new-technological manufacturing data. For example, some questions and answers may be prepared according to historical manufacturing experience and other questions and answers added to the database based on new technology.

Tape-out types comprise standard and optional, based on customers. General customers may use the standard tape-out types, but some specific customers, for example priority customers, may use optional tape-out types. The priority customers may be, for example, customers of a huge order amount or of specific manufacturing processes. Here, the provided database may comprise some customized data, whatever standard or optional, designed for specific customers.

The questions may comprise optional and specific technology information questions, based on manufacturing technology. The optional questions produce mask tooling information, such as manufacturing tool information. The specific technology information questions produce masking set for deciding used masks. The produced mask tooling information and masking set are comprised in the tape-out forms.

The tape-out types are displayed (step S202). A tape-out type selection from the displayed types is then received (step S204). The questions and corresponding answers are displayed accordingly (step S206). The tape-out types, the questions, and the answers may be displayed in a user interface in a customer computer.

Thereafter, selections of the answers of the questions are received (step S208). Tape-out forms are finally generated according to the answer selections (step S210). The answers may correspond to reference data in the provided database, such that the reference data can be displayed in a user interface and the tape-out forms are generated accordingly. Thereafter, the generated tape-out forms may be transmitted for integrated circuit manufacture (step S212).

In step S210, when the tape-out forms are generated, mask database and/or comparison checks may be executed to reduce error. The mask database, storing circuit layout files, is conventionally checked by customers, mask manufacturers, or mask manufacturing departments manually or automatically. Thus, if some error is discovered, the tape-out forms have to be regenerated. The comparison check checks a present tape-out form generation with previous one and is not executed conventionally.

Figure 3:
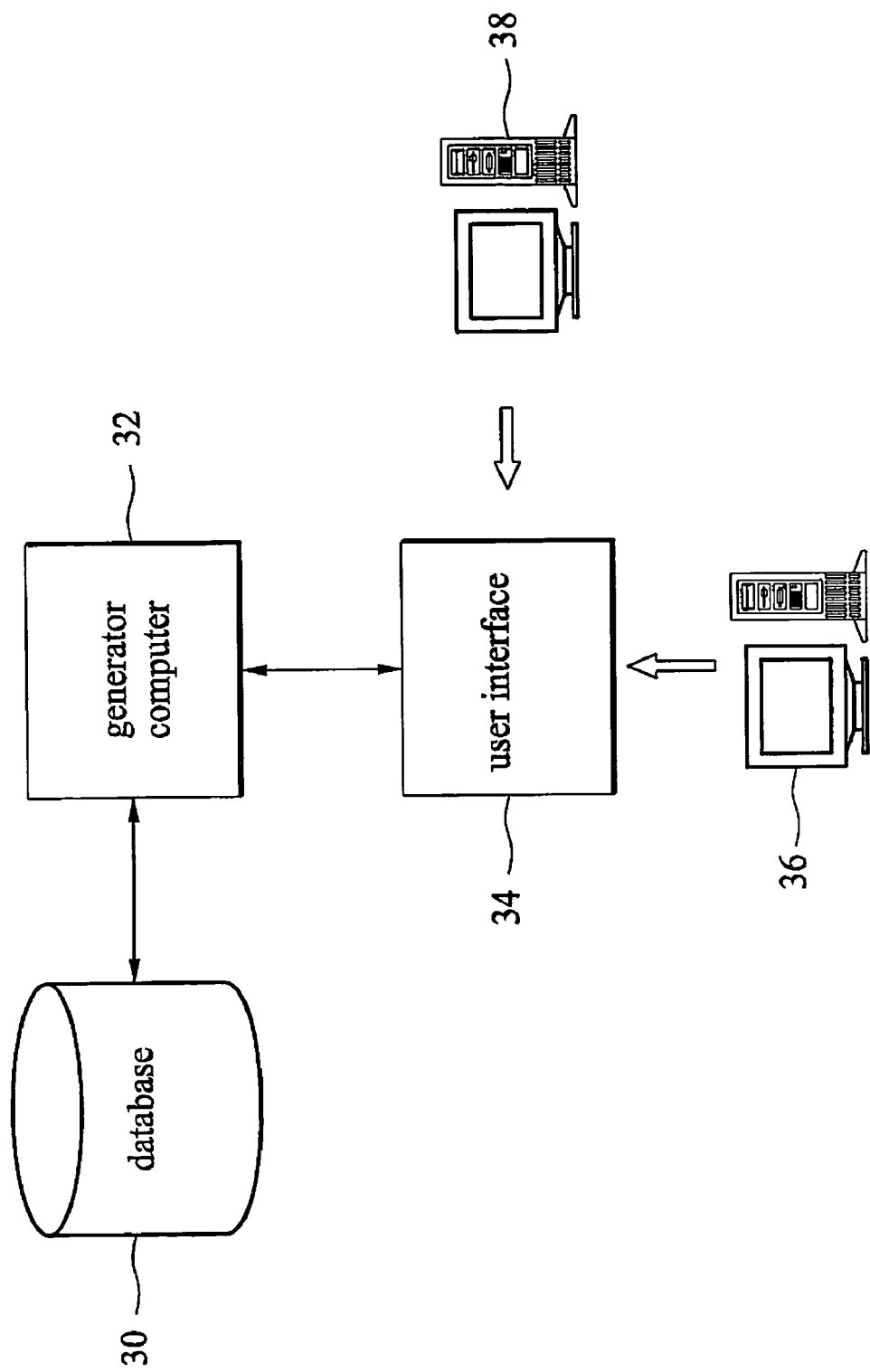
FIG. 3 is a diagram of an embodiment of a tape-out form generation system.

FIG. 3 is a diagram of an embodiment of a tape-out form generation system. A tape-out form generation system comprises a database 30 and a generator computer 32.

The database 30 comprises tape-out types, questions corresponding to the tape-out types, and answers corresponding to the questions. The questions and the answers are generated according to historical or/and new-technological manufacturing data. The database 30 may also comprise reference data corresponding to the answers.

The tape-out types comprise standard and optional tape-out types, based on customers. The corresponding questions comprise optional and specific technology information questions, based on manufacturing technology. Here, again, the optional questions produce mask tooling information, such as manufacturing tool information. The specific technology information questions produce masking set for deciding used masks. The produced mask tooling information and masking set are comprised in the tape-out forms.

The generator computer 32, coupled to the database 30, displays the tape-out types and receives a tape-out type selection therefrom. The generator computer 32 also displays questions and corresponding answers of the selected tape-out type, receives selections of the answers of the questions, and generates tape-out forms according to the selections of the answers and the reference data. The generator computer 32 may display the tape-out types, the questions, the answers, and the reference data in a user interface 34. The user interface may be established at a tape-out engineer 36 or customer end 38.

The generator computer 32 then transmits the tape-out forms for integrated circuit manufacture. Before transmission, the generator computer 32 further executes mask database and/or comparison checks.

Figure 4:
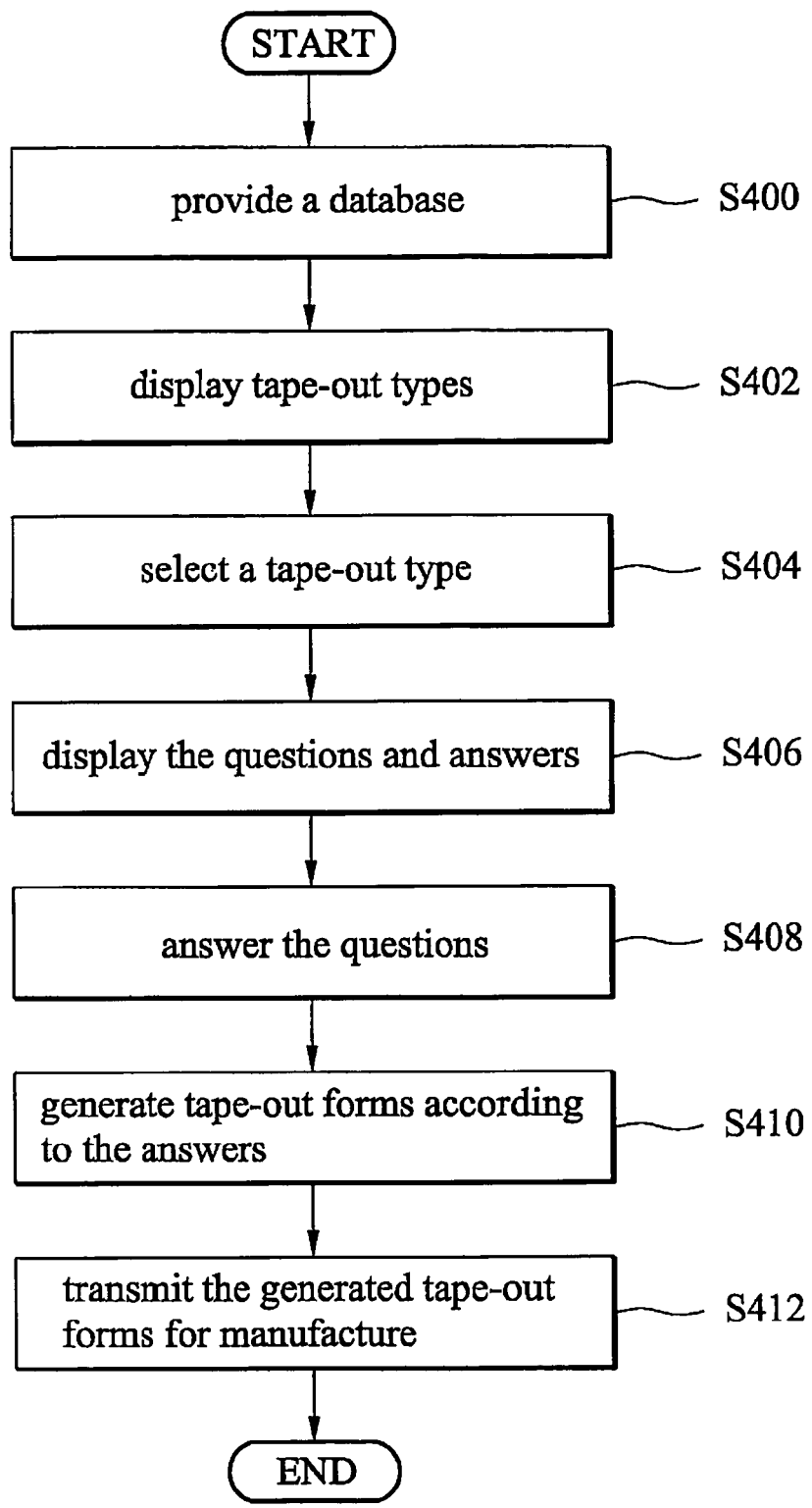
FIG. 4 is a flowchart of an embodiment of a computer-implemented tape-out form generation method.

FIG. 4 is a flowchart of an embodiment of a computer-implemented tape-out form generation method. A database is provided (step S400). The database comprises data as previously described. The tape-out types are displayed (step S402). A tape-out type is selected, for example by a customer, from the displayed types (step S404). Corresponding questions of the selected tape-out type are displayed (step S406). The questions may be answered by the customer (step S408). Tape-out forms are generated according to the answers (step S410). The tape-out types, the questions, and the answers are displayed in a user interface in a user computer, such as at a tape-out engineer or customer end. The generated tape-out forms can be transmitted for integrated circuit manufacture (step S412).

Here, again, the answers may correspond to reference data in the provided database, such that the tape-out forms are generated additionally according to the reference data. The mask database and comparison checks are accomplished after form generation and the check result may be sent to users or customers.

Figure 5:
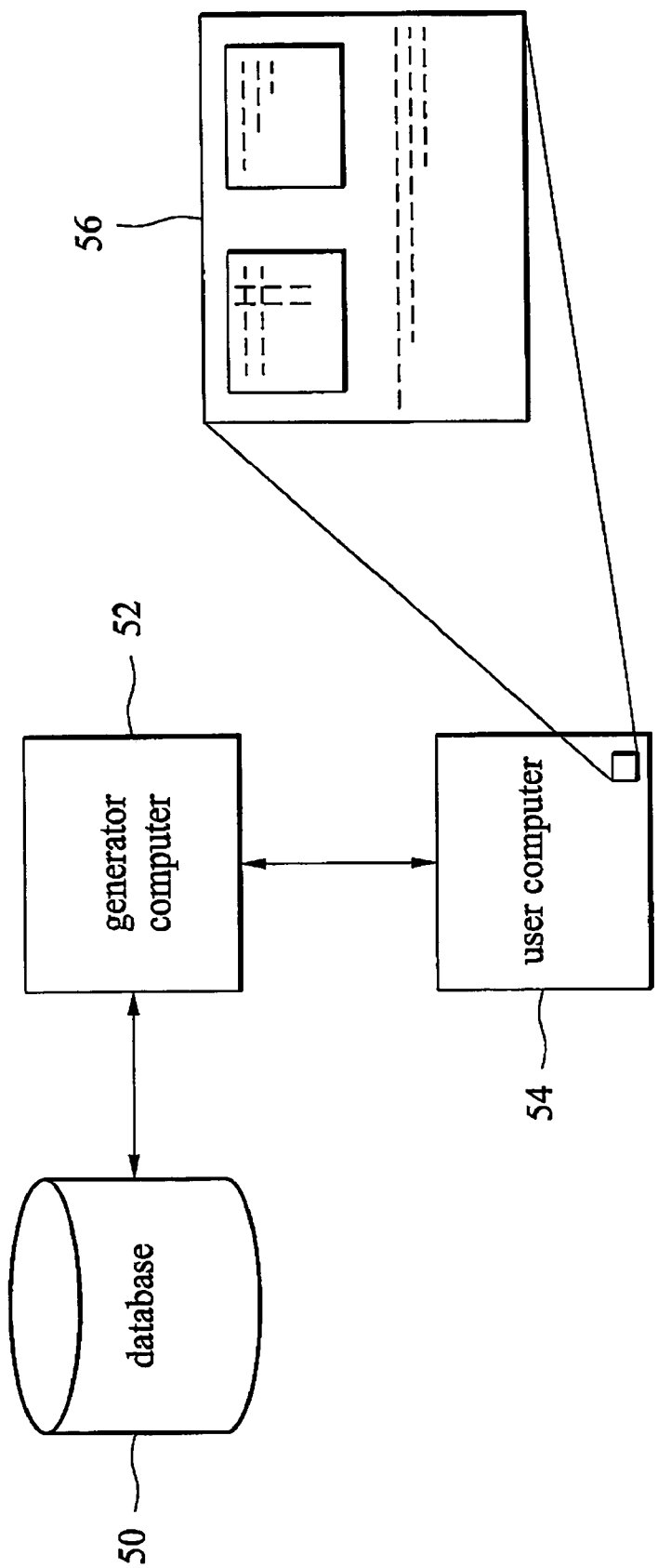
FIG. 5 is a diagram of an embodiment of a tape-out form generation system.

FIG. 5 is a diagram of an embodiment of a tape-out form generation system. A tape-out form generation system comprises a database 50, a generator computer 52, and a user computer 54.

The database 50 comprises tape-out types, questions corresponding to the tape-out types, and answers corresponding to the questions. The questions and the answers are generated according to historical or/and new-technological manufacturing data. The database 50 may additionally comprise reference data corresponding to the answers. The reference data corresponding to the answers is also generated according to historical or/and new-technological manufacturing data.

The tape-out types comprise standard and optional types, based on customers. The corresponding questions comprise optional and specific technology information questions, based on manufacturing technology. The optional questions produce mask tooling information, such as manufacturing tool information. The specific technology information questions produce masking set for deciding used masks. The produced mask tooling information and masking set are comprised in the tape-out forms.

The generator computer 52, coupled to the database 50, displays the tape-out types for selection. After a tape-out type is selected, the generator computer 52 displays corresponding questions and answers for selection and generates tape-out forms according to the received answers. The reference data can be displayed The generator computer 52 further transmits the generated tape-out forms for integrated circuit manufacture. The generator computer 52 may execute mask database and/or comparison checks after tape-out forms are generated. For example, check reports may be sent to customers for error and difference notification based on the generated tape-out forms.

The user computer 54, coupled to the generator computer 52, comprises a user interface 56 providing selection of a tape-out type from the tape-out types, and answering the corresponding questions. Here, again, the user computer may be at a tape-out engineer or customer end.

Figure 6:
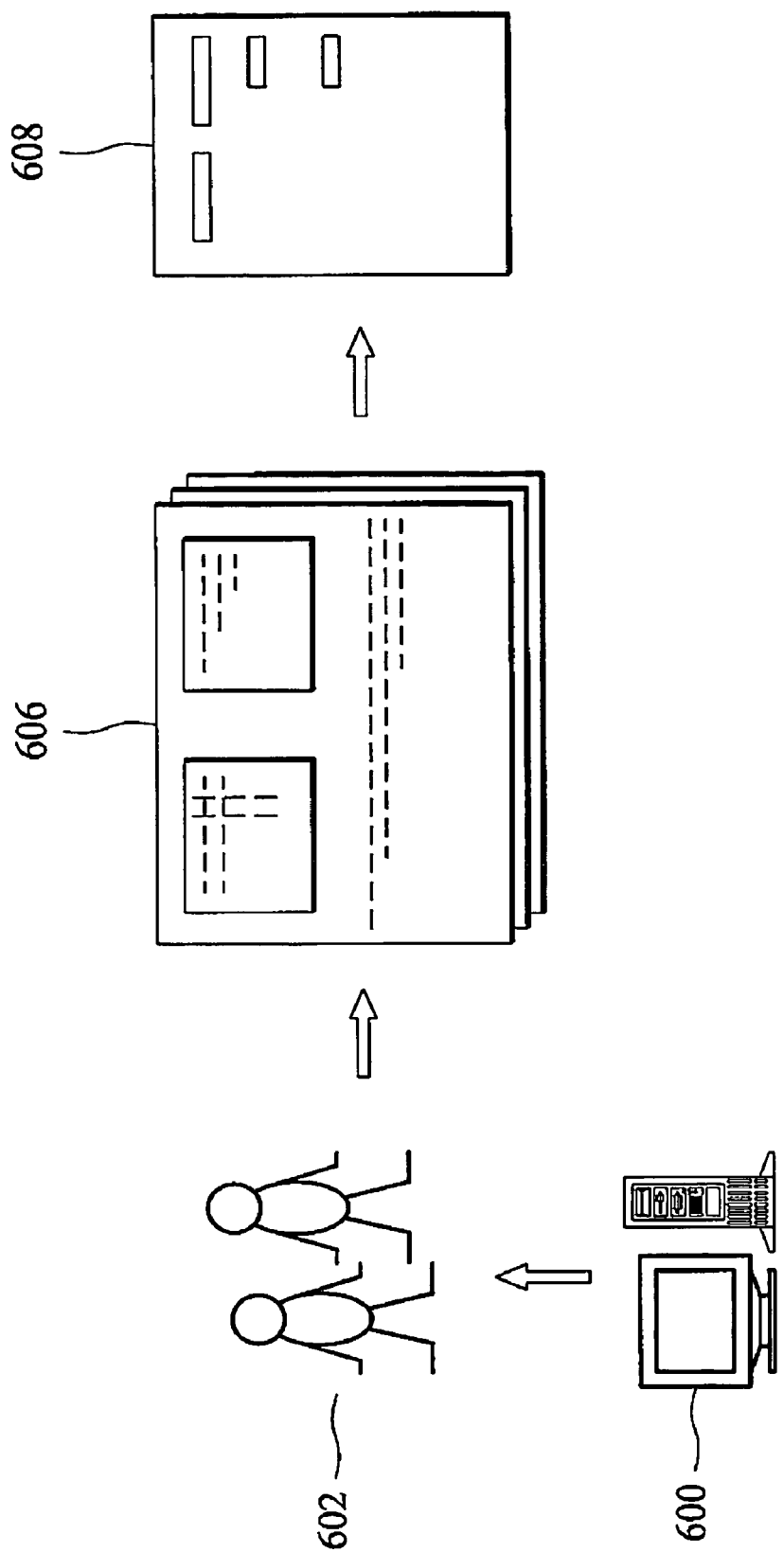
FIG. 6 is a diagram of an exemplary implementation of a tape-out form generation system.

FIG. 6 is a diagram of an exemplary implementation of a tape-out form generation system. Integrated circuit designers 600 transmit layouts of integrated circuits. Tape-out engineers and/or customers 602 input selections step-by-step according to questions generated by a generator computer. After all questions are answered, the tape-out data are ready and tape-out forms 606 are generated accordingly. With the tape-out form generation, mask database and comparison checks are executed. The tape-out forms 606 may be sent to mask manufacturers or mask manufacturing departments 608 for actual integrated circuit manufacture. The mask manufacturers or mask manufacturing departments 608 may not execute mask database and comparison checks.

Figure 1:
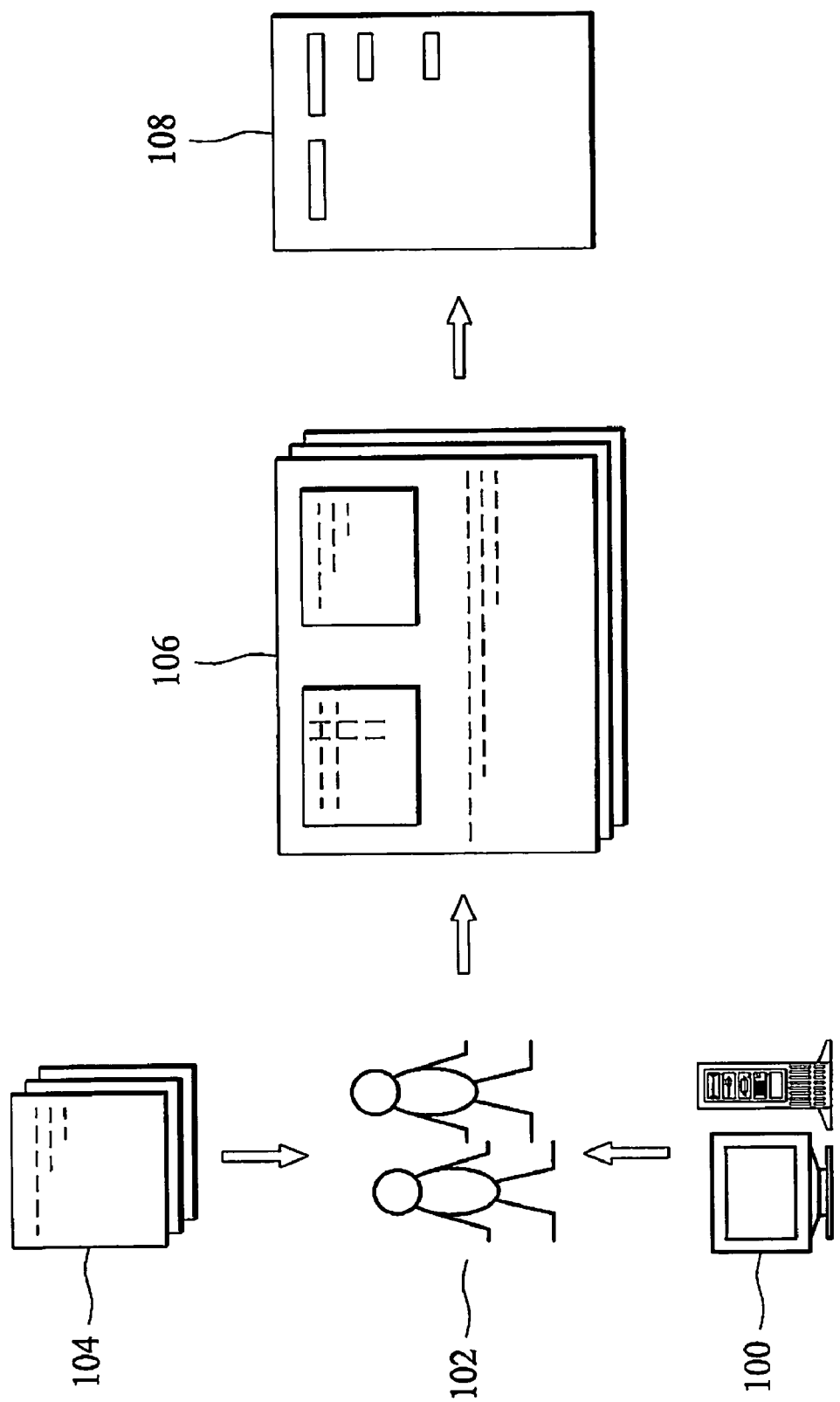
FIG. 1 is a diagram of a conventional method of tape-out form generation.

Comparing FIG. 1 with FIG. 6, the large numbered manuals 104 reference is replaced by interactive questions and corresponding answers. Mask database and comparison checks are executed automatically by the generator computer, decreasing errors and conserving manufacturing time and communication time.

While the invention has been described by way of example and in terms of preferred embodiment, it is to be understood that the invention is not limited thereto. Those skilled in the technology can still make various alterations and modifications without departing from the scope and spirit of this invention. Therefore, the scope of the present invention shall be defined and protected by the following claims and their equivalents.

What is claimed is:

1. A computer-implemented tape-out form generation method, comprising:
   providing a database comprising tape-out types, questions corresponding to the tape-out types, and answers corresponding to the questions, wherein the questions and the answers are generated according to historical or/and new-technological manufacturing data;
   displaying the tape-out types;
   receiving a tape-out type selection from the displayed tape-out types;
   displaying the questions and the corresponding answers of the selected tape-out type;
   receiving selections of the answers of the questions; and
   generating tape-out forms according to the selections of the answers,
   wherein generation of the tape-out forms further executes mask database and/or comparison checks.

2. The computer-implemented tape-out form generation method of claim 1, further transmitting the tape-out forms for integrated circuit manufacture.

3. The computer-implemented tape-out form generation method of claim 1, wherein the tape-out types comprise standard and optional tape-out types, based on customers.

4. The computer-implemented tape-out form generation method of claim 1, wherein the questions comprise optional and specific technology information questions, based on manufacturing technology.

5. The computer-implemented tape-out form generation method of claim 4, wherein the optional questions produce mask tooling information, the specific technology information questions produce masking set, and the mask tooling information and the masking set are comprised in the tape-out forms.

6. The computer-implemented tape-out form generation method of claim 1, wherein the tape-out types, the questions, and the answers are displayed in a user interface.

7. The computer-implemented tape-out form generation method of claim 1, wherein the database further comprises reference data corresponding to the answers and the tape-out forms are generated according to the reference data.

8. The computer-implemented tape-out form generation method of claim 7, wherein the reference data is displayed in a user interface.

9. A tape-out form generation system, comprising:
   a database, comprising tape-out types, questions corresponding to the tape-out types, and answers corresponding to the questions, wherein the questions and the answers are generated according to historical or/and new-technological manufacturing data; and
   a generator computer, coupled to the database, displaying the tape-out types, receiving a tape-out type selection from the tape-out types, displaying the questions and the corresponding answers of the selected tape-out type, receiving selections of the answers of the questions, and generating tape-out forms according to the selections of the answers, wherein the generator computer further executes mask database and/or comparison checks for generating tape-out forms.

10. The tape-out form generation system of claim 9, wherein the generator computer further transmits the tape-out forms for integrated circuit manufacture.

11. The tape-out form generation system of claim 9, wherein the tape-out types comprise standard and optional tape-out types, based on customers.

12. The tape-out form generation system of claim 9, wherein the corresponding questions comprise optional and specific technology information questions, based on manufacturing technology.

13. The tape-out form generation system of claim 12, wherein the optional questions produce mask tooling information, the specific technology information questions produce masking set, and the mask tooling information and the masking set are comprised in the tape-out forms.

14. The tape-out form generation system of claim 9, wherein the generator computer displays the tape-out types, the questions, and the answers in a user interface.

15. The tape-out form generation system of claim 9, wherein the database further comprises reference data corresponding to the answers and the tape-out forms are generated according to the reference data.

16. The tape-out form generation system of claim 15, wherein the generator computer displays the reference data in a user interface.

17. A computer-implemented tape-out form generation method, comprising:
   providing a database comprising tape-out types, questions corresponding to the tape-out types, and answers corresponding to the questions, wherein the questions and the answers are generated according to historical or/and new-technological manufacturing data;
   displaying the tape-out types;
   selecting a tape-out type from the tape-out types;
   displaying corresponding questions of the selected tape-out type;
   answering the questions; and
   generating tape-out forms according to the answers, wherein generation of the tape-out forms further executes mask database and/or comparison checks.

18. The computer-implemented tape-out form generation method of claim 17, further transmitting the tape-out forms for integrated circuit manufacture.

19. The computer-implemented tape-out form generation method of claim 17, wherein the tape-out types comprise standard and optional tape-out types, based on customers.

20. The computer-implemented tape-out form generation method of claim 17, wherein the corresponding questions comprise optional and specific technology information questions, based on manufacturing technology.

21. The computer-implemented tape-out form generation method of claim 20, wherein the optional questions produce mask tooling information, the specific technology information questions produce masking set, and the mask tooling information and the masking set are comprised in the tape-out forms.

22. The computer-implemented tape-out form generation method of claim 17, wherein the tape-out types, the questions, and the answers are displayed in a user interface on a user computer.

23. The computer-implemented tape-out form generation method of claim 17, wherein the database further comprises reference data corresponding to the answers and the tape-out forms are generated according to the reference data.

24. The computer-implemented tape-out form generation method of claim 23, wherein the reference is displayed in a user interface on a user computer.

25. A tape-out form generation system, comprising:
   a database, comprising tape-out types, questions corresponding to the tape-out types, and answers corresponding to the questions, wherein the questions and the answers are generated according to historical or/and new-technological manufacturing data;
   a generator computer, coupled to the database, displaying the tape-out types, displaying corresponding questions of a tape-out selection, and generating tape-out forms according to answers of the corresponding questions, wherein the generator computer further executes mask database and/or comparison checks for generating tape-out forms; and
   a user computer, coupled to the generator computer, comprising a user interface for selecting the tape-out types and answering the questions.

26. The tape-out form generation system of claim 25, wherein the generator computer further transmits the tape-out forms for integrated circuit manufacture.

27. The tape-out form generation system of claim 25, wherein the tape-out types comprise standard and optional tape-out types, based on customers.

28. The tape-out form generation system of claim 25, wherein the corresponding questions comprise optional and specific technology information questions, based on manufacturing technology.

29. The tape-out form generation system of claim 28, wherein the optional questions produce mask tooling information, the specific technology information questions produce masking set, and the mask tooling information and the masking set are comprised in the tape-out forms.

30. The tape-out form generation system of claim 25, wherein the database further comprises reference data corresponding to the answers and the tape-out forms are generated according to the reference data.

31. The tape-out form generation system of claim 30, wherein the reference data is displayed in the user interface of the user computer.

* * * * *